United States Patent
Luo

(10) Patent No.: US 9,439,230 B2
(45) Date of Patent: Sep. 6, 2016

(54) CONNECTION METHOD AND MOBILE DEVICE FOR WIRELESS DISPLAY

(71) Applicant: Huizhou TCL Mobile Communication Co., Ltd., Huizhou, Guangdong (CN)

(72) Inventor: Minli Luo, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 0 days.

(21) Appl. No.: 14/891,346

(22) PCT Filed: Mar. 27, 2015

(86) PCT No.: PCT/CN2015/075195
§ 371 (c)(1),
(2) Date: Nov. 14, 2015

(87) PCT Pub. No.: WO2016/015478
PCT Pub. Date: Feb. 4, 2016

(65) Prior Publication Data
US 2016/0183318 A1    Jun. 23, 2016

(30) Foreign Application Priority Data
Aug. 1, 2014 (CN) .......................... 2014 1 0377999

(51) Int. Cl.
| H04W 12/06 | (2009.01) |
| H04W 76/02 | (2009.01) |
| H04B 7/00 | (2006.01) |
| H04L 29/12 | (2006.01) |

(Continued)

(52) U.S. Cl.
CPC ........ *H04W 76/023* (2013.01); *G06K 7/10722* (2013.01); *G06K 7/1417* (2013.01); *H04L 61/6022* (2013.01); *H04M 1/72527* (2013.01);
(Continued)

(58) Field of Classification Search
CPC ... H04W 4/008; H04W 12/06; H04W 76/02; H04B 7/00
USPC .................... 455/41.2, 414.1, 566
See application file for complete search history.

(56) References Cited

U.S. PATENT DOCUMENTS

| 9,077,713 B1 * | 7/2015 | Zheng .................. H04W 12/00 |
| 2013/0163442 A1 * | 6/2013 | Livingston ............ H04W 48/16 370/252 |

(Continued)

FOREIGN PATENT DOCUMENTS

| CN | 102802155A A | 11/2012 |
| CN | 103257839 A | 8/2013 |

*Primary Examiner* — Blane Jackson
(74) *Attorney, Agent, or Firm* — Andrew C. Cheng

(57) ABSTRACT

A connection method for wireless display is provided. The connection method includes: activating by a mobile device an application program; acquiring by the mobile device a two-dimensional barcode image; determining by the mobile device whether the two-dimensional barcode image is identical with a prestored image, if not, processing the two-dimensional barcode image to obtain a WiFi MAC address; determining by the mobile device whether the format of the WiFi MAC address is correct, if so, storing the two-dimensional barcode image and its corresponding WiFi MAC address; broadcasting by the mobile device the WiFi MAC address to a WiFi display module of the mobile device, and establishing a data connection with the WiFi display module via the WiFi MAC address; performing data transmission by the mobile device with the display device. By the above means, the present disclosure can effectively improve the connection efficiency between the mobile device and the display device and can thus greatly enhance the user experience.

20 Claims, 5 Drawing Sheets

(51) Int. Cl.
*H04M 1/725* (2006.01)
*G06K 7/10* (2006.01)
*G06K 7/14* (2006.01)
*H04W 84/12* (2009.01)

(52) U.S. Cl.
CPC .... *G06K 2007/10524* (2013.01); *H04W 84/12* (2013.01)

(56) References Cited

U.S. PATENT DOCUMENTS

2014/0230085 A1\* 8/2014 Barten ............... A01H 5/08 800/260
2015/0230085 A1\* 8/2015 Xue ................ G06F 17/30725 726/6

\* cited by examiner

US 9,439,230 B2

CONNECTION METHOD AND MOBILE DEVICE FOR WIRELESS DISPLAY

FIELD OF THE DISCLOSURE

The present disclosure relates to the field of communication technologies, and more particularly, to a connection method for wireless display and a mobile device implementing the connection method.

BACKGROUND OF THE DISCLOSURE

With the advancement of mobile devices, more and more devices can now work cooperatively with a mobile device. For example, a mobile device may have data communication with a household display device such as a television. Currently, many mobile devices based on Android system may support the international standard WiFi (wireless fidelity) display technology issued by the WiFi alliance. Technology involved therein may relate to mirroring the graphical image displayed on the screen of the mobile device to a display device with a larger screen, which may provide better entertainment experience for the user.

Currently, however, when connecting a mobile device with a display device, the user may need to activate an application program, search for surrounding devices, and click on the display device that is desirable to be connected to when surrounding devices are discovered, only after which the mobile device can be truly connected to the display device. As can be seen, the process is excessively slow and thus causes inconvenience to the user and degrades the user experience.

In view of the above, it is thus necessary to provide a connection method for wireless display and an associated mobile device to address the above issue.

SUMMARY OF THE DISCLOSURE

The primary technical issue the present disclosure attempting to address is to provide a connection method for wireless display, which can improve the connection efficiency between a mobile device and a display device and thus can effectively enhance the user experience.

To solve the aforementioned technical issue, a technical solution adopted by the present disclosure follows as below: to provide a connection method for wireless display, the connection method including: activating by a mobile device an application program, wherein a camera of the mobile device may be turned on concurrently when the application program is activated; scanning by the mobile device via the camera a two-dimensional barcode image displayed on a screen of a display device to acquire the two-dimensional barcode image, wherein the two-dimensional barcode image is recorded with a WiFi MAC address (media access control address); determining by the mobile device whether the two-dimensional barcode image is identical with a prestored image, if not, then processing the two-dimensional barcode image to obtain the WiFi MAC address; further determining by the mobile device whether the format of the WiFi MAC address is correct, if so, storing the two-dimensional barcode image and its corresponding WiFi MAC address; broadcasting by the mobile device the WiFi MAC address to a WiFi display module of the mobile device, and establishing by the WiFi display module a data connection with the display device via the WiFi MAC address; determining by the mobile device whether the signal strength of the current WiFi network is greater than a predetermined value; when the mobile device determines that the signal strength of the current WiFi network is greater than the predetermined value, implementing data transmission by the mobile device with the display device; wherein, the connection method may further include: if the two-dimensional barcode image is determined to be identical with the prestored image, then acquiring the WiFi MAC address corresponding to the prestored image, and establishing by the WiFi display module a data connection with the display device via the WiFi MAC address.

Processing the two-dimensional barcode image to obtain the WiFi MAC address may include: applying binarization processing on the two-dimensional barcode image to acquire multiple binary values; searching for positioning symbols and correction symbols in the multiple binary values; applying image transformation on the multiple binary values to generate a symbol code matrix; decoding the symbol code matrix conforming to coding standards, and acquiring the parsed data containing the WiFi MAC address.

Implementing the data transmission by the mobile device with the display device may include: transmitting by the mobile device the image data displayed on a screen of the mobile device to the display device, enabling the display device to display on its screen an image corresponding to the image data.

Implementing the data transmission by the mobile device with the display device may also include: acquiring by the mobile device the image data displayed on the screen of the display device, and displaying on the screen of the mobile device an image corresponding to the image data.

To solve the aforementioned technical issue, another technical solution adopted by the present disclosure follows as below: to provide a connection method for wireless display, the connection method including: activating by a mobile device an application program, wherein a camera of the mobile device may be turned on concurrently when the application program is activated; scanning by the mobile device via the camera a two-dimensional barcode image displayed on a screen of a display device to acquire the two-dimensional barcode image, wherein the two-dimensional barcode image is recorded with a WiFi MAC address; determining by the mobile device whether the two-dimensional barcode image is identical with a prestored image, if not, then processing the two-dimensional barcode image to obtain the WiFi MAC address; further determining by the mobile device whether the format of the WiFi MAC address is correct, if so, storing the two-dimensional barcode image and its corresponding WiFi MAC address; broadcasting by the mobile device the WiFi MAC address to a WiFi display module of the mobile device, and establishing by the WiFi display module a data connection with the display device; implementing data transmission by the mobile device with the display device.

The connection method may further include: if the two-dimensional barcode image is determined to be identical with the prestored image, then acquiring the WiFi MAC address corresponding to the prestored image, and establishing by the WiFi display module a data connection with the display device via the WiFi MAC address.

Processing the two-dimensional barcode image to acquire the WiFi MAC address may include: applying binarization processing on the two-dimensional barcode image to acquire multiple binary values; searching for positioning symbols and correction symbols in the multiple binary values; applying image transformation on the multiple binary values to generate a symbol code matrix; decoding the symbol code matrix conforming to coding standards, and acquiring the parsed data containing the WiFi MAC address.

Implementing the data transmission by the mobile device with the display device may include: transmitting by the mobile device the image data displayed on a screen of the mobile device to the display device, enabling the display device to display on its screen an image corresponding to the image data.

Implementing the data transmission by the mobile device with the display device may also include: acquiring by the mobile device the image data displayed on the screen of the display device, and displaying on the screen of the mobile device an image corresponding to the image data.

In order to solve the aforementioned technical issue, yet another technical solution adopted by the present disclosure follows as below: to provide a mobile device, comprising: an application program module configured to activate an application program, wherein a camera of the mobile device may be turned on concurrently when the application program is activated; an image acquisition module connected to the application program module, being configured to scan a two-dimensional barcode image displayed on a screen of a display device via the camera and thus acquire the two-dimensional barcode image, wherein the two-dimensional barcode image is recorded with a WiFi MAC address of the display device; an image determination module connected to the image acquisition module, being configured to determine whether the two-dimensional barcode image is identical with a prestored image; an address acquisition module connected to the image determination module, being configured to, when the image determination module determines that the two-dimensional barcode image is not identical with the prestored image, process the two-dimensional barcode image to obtain the WiFi MAC address; an address format determination module connected to the address acquisition module, being configured to determine whether the format of the WiFi MAC address is correct; a storage module connected to the address format determination module, being configured to, when the address format determination module determines that the format of the WiFi MAC address is correct, store the two-dimensional barcode image and its corresponding WiFi MAC address; a data broadcasting module connected to the storage module, being configured to broadcast the WiFi MAC address to the WiFi display module of the mobile device; the WiFi display module connected to the data broadcasting module, being configured to establish a data connection with the display device via the WiFi MAC address; a data transmission module connected to the WiFi display module, being configured to, when the WiFi display module completes the establishment of data connection with the display device via the WiFi MAC address, perform data transmission with the display device.

The address acquisition module may be further configured to, when the image determination module determines that the two-dimensional barcode image is identical with the prestored image, acquire the WiFi MAC address corresponding to the prestored image, enabling the WiFi display module to establish a data connection with the display device via the WiFi MAC address.

The address acquisition module may include: a binarization module configured to apply binarization processing on the two-dimensional barcode image to acquire multiple binary values; a symbol searching unit connected to the binarization unit and configured to search for positioning symbols and correction symbols in the multiple binary values; an image transformation unit connected to the symbol searching unit and configured to apply image transformation on the multiple binary values to generate a symbol code matrix; a decoding unit connected to the image transformation unit, and configured to decode the symbol code matrix conforming to coding standards and thus acquire the parsed data containing the WiFi MAC address.

The data transmission module may transmit the image data displayed on a screen of the mobile device to the display device, enabling the display device to display an image corresponding to the image data on the screen of the display device.

The data transmission module may acquire the image data displayed on the screen of the display device, and display an image corresponding to the image data on the screen of the mobile device.

Beneficial effects of the present disclosure are: differing from the prior art, the mobile device according to the present disclosure scans a two-dimensional barcode image displayed on a screen of a display device via the camera, determines whether the two-dimensional barcode image is identical with a prestored image, if not, processes the two-dimensional barcode image to acquire the WiFi MAC address of the display device, further determines whether the format of the two-dimensional barcode image is correct, if so, stores the two-dimensional barcode image and its corresponding WiFi MAC address, broadcasts the WiFi MAC address to the WiFi display module of the mobile device, which may establishes a data connection with the display device via the WiFi MAC address, thus finally realizing the data transmission between the mobile device and the display device. In short, the mobile device in the present disclosure scans the two-dimensional barcode image displayed on the screen of the display device, and thereby establishes a data connection with the display device, which thus can increase the connection speed between the mobile device and the display device and thus can effectively enhances the user experience.

DETAILED DESCRIPTION OF THE DISCLOSURE

The present disclosure will be described in detail in relation to the accompanying drawings and embodiments.

Figure 1:
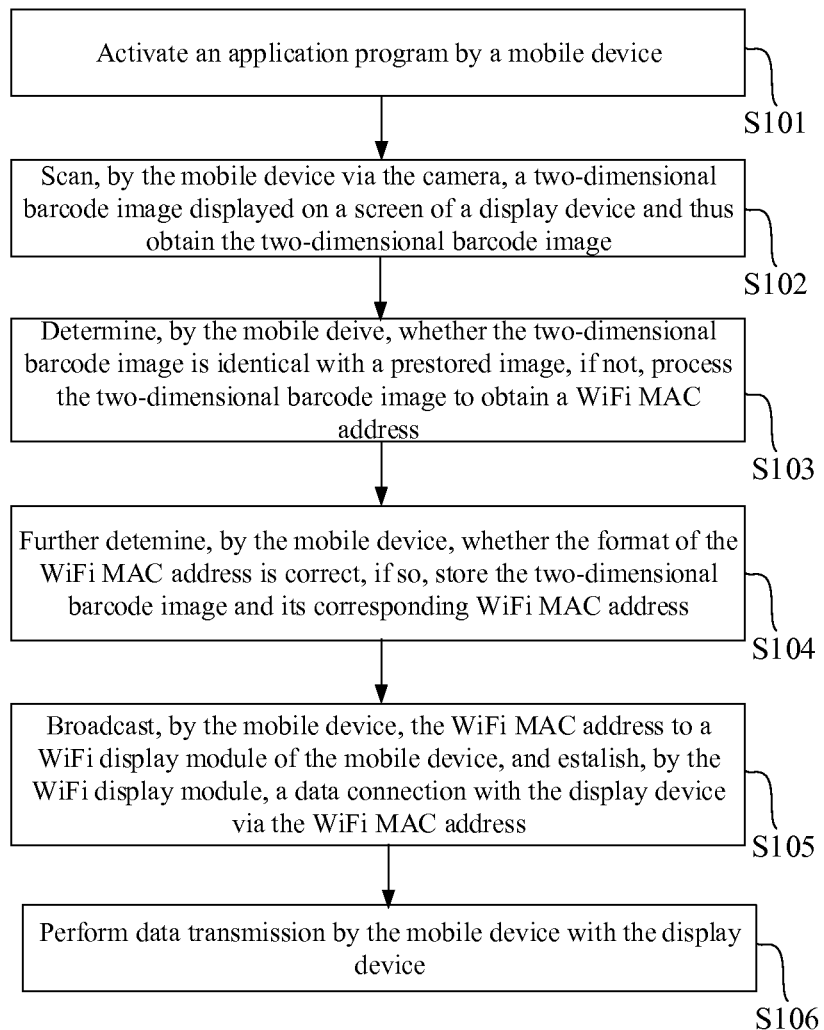
FIG. 1 is a flow chart illustrating a connection method for wireless display according to a first embodiment of the present disclosure.

Referring now to FIG. 1, a flow chart illustrating a connection method for wireless display according to a first embodiment of the present disclosure is shown. The connection method includes the following steps:

Step S101: activating by a mobile device an application program.

A camera of the mobile device may be turned on concurrently when the application program is activated. Alternatively, the camera can be also turned on without the activation of the application program. Namely, the user may turn on the camera manually.

Step S102: scanning by the mobile device via the camera a two-dimensional barcode image displayed on a screen of a display device to acquire the two-dimensional barcode image.

The two-dimensional barcode image may be recorded with the display device's WiFi MAC address, model, manufacturer, and the like. In step S102, when scanning the two-dimensional barcode image displayed on the screen of the display device, the following errors would occur. For example, the camera may be not aligned with the two-dimensional barcode image, but the camera can only scan a portion of the two-dimensional barcode image. For these cases, if the proportion of two-dimensional barcode image scanned by the camera is less than ⅔ of the original two-dimensional barcode image, then the user will be prompted to rescan. If the proportion of two-dimensional barcode image scanned by the camera is greater than ⅔ of the original two-dimensional barcode image, then the camera acquires the portion of two-dimensional barcode image that is scannable; if the camera can only scan ⅔ of the original two-dimensional barcode image, then the camera may obtain and restore the ⅔ of the original two-dimensional barcode image into a complete two-dimensional barcode image; if the camera can only scan ¾ of the original two-dimensional barcode image, then the camera may obtain and restore the ¾ of the original two-dimensional barcode image into a complete two-dimensional barcode image. The camera may, certainly, not restore the ⅔ or ¾ of the original two-dimensional barcode image when acquiring the ⅔ or ¾ of the original two-dimensional barcode image.

Step S103: determining by the mobile device whether the two-dimensional barcode image is identical with a prestored image, if not, processing the two-dimensional barcode image to obtain a WiFi MAC address.

In step S103, Hash algorithm may preferably be chosen as the image comparison algorithm for determining whether the two-dimensional barcode image is identical with the prestored image. Certainly, other algorithms can also be chosen as the image comparison algorithm. When determining whether the two-dimensional barcode image is identical with the prestored image, if the two-dimensional barcode image and the prestored image have more than ⅔ in common, they may be determined to be identical. For example, when ⅔ of the original two-dimensional barcode image is scanned and obtained, it may be compared against the prestored image. If the prestored image contains the ⅔ of the original two-dimensional barcode image, then the ⅔ of the original two-dimensional barcode image may be determined to be identical with the prestored image. Also for example, when ¾ of the original two-dimensional barcode image is scanned and obtained, it may be compared against the prestored image. If the prestored image contains the ¾ of the original two-dimensional barcode image, then the ¾ of the original two-dimensional barcode image may be determined to be identical with the prestored image.

When the two-dimensional barcode image is determined to be identical with the prestored image, the WiFi MAC address corresponding to the prestored image may be obtained, and the WiFi display module may establish a data connection with the display device over the WiFi MAC address. Namely, the mobile device may establish a data connection with the display device.

Figure 2:
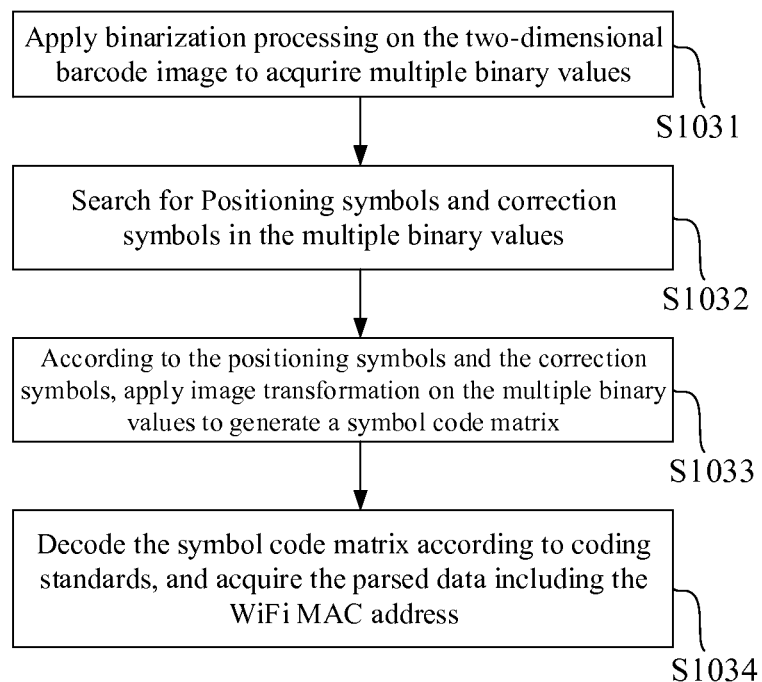
FIG. 2 is a flow chart illustrating the sub-steps of step S103 as shown in FIG. 1.

Referring now to FIG. 2, processing the two-dimensional barcode image to acquire the WiFi MAC address may include the following sub-steps:

Step S1031: applying binarization processing on the two-dimensional barcode image to acquire multiple binary values;

Step S1032: searching for positioning symbols and correction symbols in the multiple binary values;

Step S1033: according to the positioning symbols and the correction symbols, performing image transformation on the multiple binary values to generate a symbol code matrix;

Step S1034: decoding the symbol code matrix conforming to coding standards, and acquiring the parsed data containing the WiFi MAC address when the decoding is completed.

Step S104: further determining by the mobile device whether the format of the WiFi MAC address is correct, if so, storing the two-dimensional barcode image and its corresponding WiFi MAC address.

A WiFi MAC address generally has 48 bits (6 groups of bits) in total, of which the format, when represented in hexadecimal, can be: xx:xx:xx:xx:xx:xx, for example, 00:66:65:2d:e4:2b. If the WiFi MAC address belongs to the format of xx:xx:xx:xx:xx:xx, then the format of the WiFi MAC address is determined to be correct.

In step S104, if the format of the WiFi MAC address is determined to be incorrect, the two-dimensional barcode image displayed on the screen of the display device may be rescanned. If the format of the WiFi MAC address is determined to be correct, the two-dimensional barcode image and its corresponding WiFi MAC address may be stored. It should be appreciated that, the WiFi MAC address, when stored, may have one-to-one correspondence with the two-dimensional barcode image. For example, 00:66:65:2d:e4:2b may be uniquely corresponding to a two-dimensional barcode image, while 01:66:65:1d:e4:5b may be uniquely corresponding to another two-dimensional barcode image.

Step S105: broadcasting by the mobile device the WiFi MAC address to the WiFi display module of the mobile device, and establishing a data connection by the WiFi display module with the display device via the WiFi MAC address.

In step S105, the mobile device may communicate or transmit the WiFi MAC address to the WiFi display module of the mobile device. The WiFi display module may support WiFi display technology, and thus can transmit or receive data through the WiFi display technology. The display device may also be provided with a WiFi display module, and thus can also transmit or receive data through the WiFi display technology.

Step S106: performing data transmission by the mobile device with the display device.

In this embodiment, the mobile device may transmit the image data displayed on the screen of the mobile device to the display device, enabling the display device to display an image corresponding to the image data on the screen of the display device.

In other embodiments, the mobile device may acquire the image data displayed on the screen of the display device, and display an image corresponding to the image data on the screen of the mobile device.

In other embodiments, the mobile device may transmit the image data displayed on the screen of the mobile device to the display device, enabling the display device and the mobile device to display images corresponding to the image data on the screen of the mobile device and the screen of display device concurrently.

Figure 3:
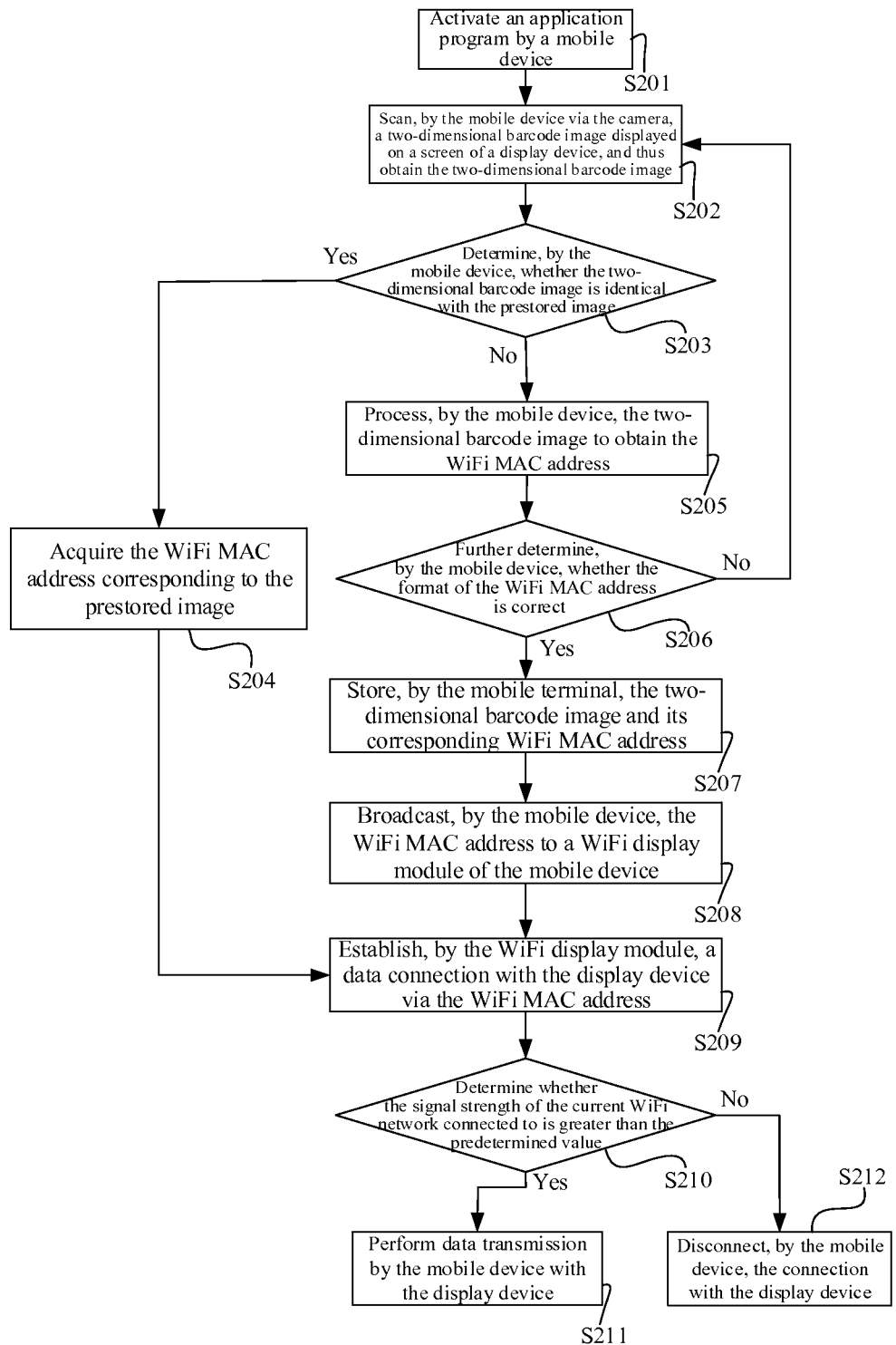
FIG. 3 is a flow chart illustrating a connection method for wireless display according to a second embodiment of the present disclosure.

Referring now to FIG. 3, a flow chart illustrating a connection method for wireless display according to a second embodiment of the present disclosure is shown. The connection method includes the following steps:

Step S201: activating by the mobile device an application program.

Step S202: scanning by the mobile device via a camera a two-dimensional barcode image displayed on screen of a display device to acquire the two-dimensional barcode image.

Step S203: determining by the mobile device whether the two-dimensional barcode image is identical with a prestored image.

When the mobile device determines that the two-dimensional barcode image is not identical with the prestored image, then go to step S205: processing by the mobile device the two-dimensional barcode image to obtain a WiFi MAC address.

When the WiFi MAC address is obtained, then step S206 will be entered: determining by the mobile device whether the format of the WiFi MAC address is correct. If the mobile device determines that the format of the WiFi MAC address is incorrect, then return to step S202. If the mobile device determines that the format of the WiFi MAC address is correct, then go to step S207: storing by the mobile device the two-dimensional barcode image and its corresponding WiFi MAC address.

After the WiFi MAC address is stored, step S208 will be entered: broadcasting by the mobile device the WiFi MAC address to the WiFi display module of the mobile device.

Step S209: establishing a data connection by the WiFi display module with the display device over the WiFi MAC address.

In step S203, if the mobile device determines that the two-dimensional barcode image is identical with the prestored image, then go to step S204: acquiring the WiFi MAC address corresponding to the prestored image. After the WiFi MAC address is obtained, go to step S209.

In this embodiment, displaying data on the display device generally has relatively large traffic requirements. That is, if the signal strength of the WiFi network to which the mobile device and the display device are connected to is too weak, then it is not appropriate for data transmission between the mobile device and the display device, even if the mobile device and the display device can still be connected when the signal strength of the WiFi network is very weak. In particular, data cannot be transmitted properly under this condition, and it would be only a waste of power when the data transmission is kept on.

Thus, step S210 will be entered when the mobile device completes the connection with the display device: determining whether the signal strength of the current WiFi network is greater than a predetermined value. If the signal strength of the current WiFi network is determined to be greater than the predetermined value, then step S211 will be entered: performing data transmission by the mobile device and the display device. If the signal strength of the current WiFi network is determined to be smaller than the predetermined value, then step S212 will be entered: disconnecting by the mobile device the connection with the display device.

The predetermined value may preferably be −70 dbm, and, certainly, can also be other values which may be determined according to actual situations. If the signal strength of the current WiFi network is smaller than −70 dbm, then it indicates that the WiFi signal is weak, thus jump to step S212; if the signal strength of the current WiFi network is greater than −70 dbm, then it indicates that the WiFi signal is strong, the user may be reassured to use the WiFi network connection and step S211 will be entered.

Figure 4:
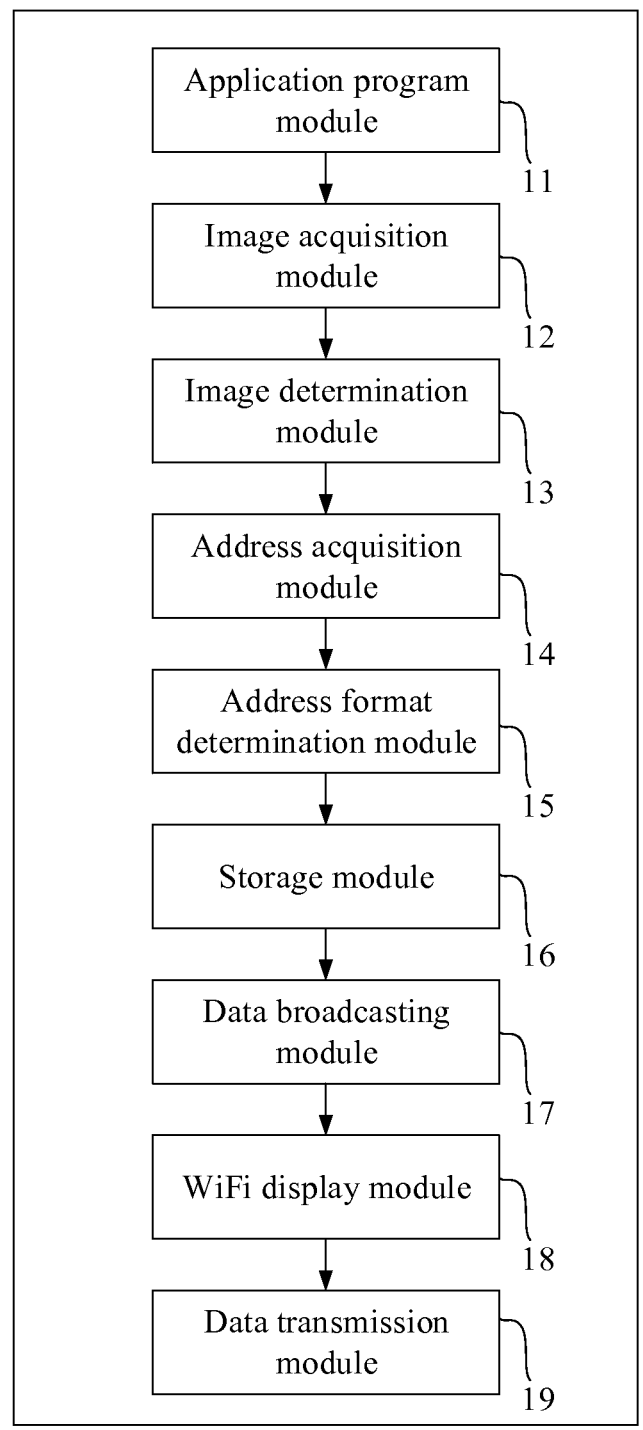
FIG. 4 is a block diagram illustrating a mobile device according to the present disclosure.

Referring now to FIG. 4, a block diagram illustrating a mobile device according to the present disclosure is shown. The mobile device corresponds to the above connection method for wireless display. The mobile device includes an application program module 11, an image acquisition module 12, an image determination module 13, an address acquisition module 14, an address format determination module 15, a storage module 16, a data broadcasting module 17, a WiFi display module 18 and a data transmission module 19.

The application program module 11 is configured to activate an application program. A camera of the mobile device may be turned on concurrently when the application program is activated.

The image acquisition module 12 is connected to the application program module 11, and is configured to scan a two-dimensional barcode image displayed on a screen of a display device via the camera to obtain the two-dimensional barcode image. The two-dimensional barcode image may be recorded with the display device's WiFi MAC address.

If the proportion of two-dimensional barcode image scanned by the camera is smaller than ⅔ of the original two-dimensional barcode image, then the image acquisition module 12 may prompt the user to rescan. If the proportion of two-dimensional barcode image scanned by the camera is greater than ⅔ of the original two-dimensional barcode image, then the image acquisition module 12 may acquire the portion of two-dimensional barcode image that is scannable by the camera; if the camera can only scan ⅔ of the original two-dimensional barcode image, then the image acquisition module 12 may obtain and restore the ⅔ of the original two-dimensional barcode image into a complete two-dimensional barcode image; if the camera can only scan ¾ of the original two-dimensional barcode image, then the image acquisition module 12 may obtain and restore the ¾ of the original two-dimensional barcode image into a complete two-dimensional barcode image. The image acquisition module 12 may, certainly, not restore the ⅔ or ¾ of the original two-dimensional barcode image when obtaining the ⅔ or ¾ of the original two-dimensional barcode image.

The image determination module 13 is connected to the image acquisition module 12, and is configured to determine whether the two-dimensional barcode image is identical with a prestored image.

If ⅔ of the original two-dimensional barcode image is scanned and obtained, then the image determination module 13 may compare the obtained two-dimensional barcode image against the prestored image. If the prestored image contains the ⅔ of the original two-dimensional barcode image, then the image determination module 13 determines that the ⅔ of the original two-dimensional barcode image is identical with the prestored image. If ¾ of the original two-dimensional barcode image is scanned and obtained, then the image determination module 13 may compare the obtained two-dimensional barcode image against the prestored image. If the prestored image contains the ¾ of the original two-dimensional barcode image, then the image determination module 13 determines that the ¾ of the original two-dimensional barcode image is identical with the prestored image.

The address acquisition module 14 is connected to the image determination module 13, and is configured to, when the image determination module 13 determines that the two-dimensional barcode image is not identical with the prestored image, process the two-dimensional barcode image to obtain the WiFi MAC address. The address acquisition module 14 may be further configured to, when the image determination module 13 determines that the two-dimensional barcode image is identical with the prestored image, acquire the WiFi MAC address corresponding to the prestored image.

The address acquisition module 14 may include a binarization unit 141, a symbol searching unit 142, an image transformation unit 143 and a decoding unit 144. The binarization unit 141 is configured to process the two-dimensional barcode image to acquire multiple binary values. The symbol searching unit 142 is connected to the binarization unit 141, and is configured to search for positioning symbols and correction symbols in the multiple binary values. The image transformation unit 143 is connected to the symbol searching unit 142 and configured to apply image transformation on the multiple binary values according to the positioning symbols and the correction symbols, so as to generate a symbol code matrix. The decoding unit 144 is connected to the image transformation unit 143, and is configured to decode the symbol code matrix conforming to coding standards, and thus acquire the parsed data containing the WiFi MAC address when the decoding is completed.

The address format determination module 15 is connected to the address acquisition module 14, being configured to determine whether the format of the WiFi MAC address is correct.

The storage module 16 is connected to the address format determination module 15, and is configured to, when the address format determination module 15 determines that the format of the WiFi MAC address is correct, store the two-dimensional barcode image and its corresponding WiFi MAC address.

The data broadcasting module 17 is connected to the storage module 16, and is configured to broadcast the WiFi MAC address to the WiFi display module 18 of the mobile device.

The WiFi display module 18 is connected to the data broadcasting module 17, and is configured to establish a data connection with the display device over the WiFi MAC address. In this embodiment, the WiFi display module 18 may support the WiFi display technology, and thus can transmit or receive data through the WiFi display technology. The display device may also support WiFi display technology, and thus can also receive or transmit data through the WiFi display technology.

The WiFi display module 18 may be further configured to determine whether the signal strength of the current WiFi network is greater than a predetermined value. If the signal strength of the current WiFi network is greater than the predetermined value, then the WiFi display module 18 may establish a data connection with the display device successfully. If the signal strength of the current WiFi network is determined to be smaller than the predetermined value, then the WiFi display module 18 fails to establish a data connection with the display device.

The data transmission module 19 is connected to the WiFi display module 18, being configured to, when the WiFi display module 18 successfully establishes the data connection with the display device over the WiFi MAC address, perform the data transmission.

In this embodiment, the data transmission module 19 may transmit the image data displayed on a screen of the mobile device to the display device, enabling the display device to display an image corresponding to the image data on the screen of the display device.

In other embodiments, the data transmission module 19 may also acquire the image data displayed on the screen of the display device, and display an image corresponding to the image data on the screen of the mobile device.

In other embodiments, the data transmission module 19 may also transmit the image data displayed on the screen of the mobile device to the display device, enabling the display device and the mobile device to display images corresponding to the image data on the screen of the mobile device and on the screen of the display device concurrently.

As is stated above, the mobile device according to the present disclosure scans the two-dimensional barcode image displayed on the screen of the display device via the camera, determines whether the two-dimensional barcode image is identical with the prestored image, if not, processes the two-dimensional barcode image to obtain the WiFi MAC address, further determines whether the format of the two-dimensional barcode image is correct, if so, stores the two-dimensional barcode image and its corresponding WiFi MAC address, broadcasts the WiFi MAC address to the WiFi display module of the mobile device, and establishes a data connection with the WiFi display module over the WiFi MAC address, thus finally realizing the data transmission between the mobile device and the display device. In short, the mobile device according to the present disclosure scans the two-dimensional barcode image displayed on the screen of the display device, and establishes a data connection with the display device, which thus can increase the connection speed between the mobile device and the display device, thereby effectively enhancing the user experience.

Figure 5:
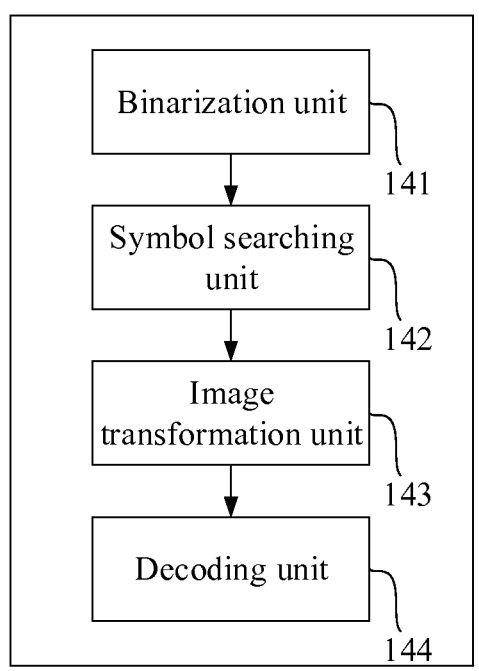
FIG. 5 is a block diagram depicting the address acquisition module as shown in FIG. 4.

Furthermore, it is apparent to those skilled in the art that, the present disclosure also provides a mobile device for wireless display, the mobile device comprising a non-transitory program storage medium and a processor. The non-transitory program storage medium stores a program executed by the processor to perform the methods as described afore. Furthermore, it is apparent to those skilled in the art that various modules 11, 12, 13, 14, 15, 16, 17, 18, 19, 141, 142, 143, 144 as shown in FIG. 4 or FIG. 5 are software modules or software units. In another aspect, it is well-known that various software modules or software units are inherently stored in the non-transitory program storage medium and executed by the processor.

What is described above is merely embodiments of the present disclosure, thus shouldn't be construed to be limiting the patent scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A connection method for wireless display, comprising:
activating, by a mobile device, an application program, wherein a camera of the mobile device is turned on concurrently when the application program is activated;
scanning, by the mobile device via the camera, a two-dimensional barcode image displayed on a screen of a display device and thus acquiring the two-dimensional barcode image, wherein the two-dimensional barcode image is recorded with a WiFi MAC address of the display device;
determining, by the mobile device, whether the two-dimensional barcode image is identical with a prestored image, if not, processing the two-dimensional barcode image to acquire the WiFi MAC address;

further determining by the mobile device whether a format of the WiFi MAC address is correct, when it is correct, storing the two-dimensional barcode image and its corresponding WiFi MAC address;

broadcasting, by the mobile device, the WiFi MAC address to a WiFi display module of the mobile device, and establishing a data connection by the WiFi display module with the display device via the WiFi MAC address;

determining, by the mobile device, whether signal strength of current WiFi network is greater than a predetermined value; and when the signal strength of the current WiFi network is determined to be greater than the predetermined value, performing data transmission by the mobile device with the display device;

when the two-dimensional barcode image is determined to be identical with the prestored image, acquiring the WiFi MAC address corresponding to the prestored image, and establishing a data connection by the WiFi display module with the display device via the WiFi MAC address.

2. The connection method according to claim 1, wherein the processing the two-dimensional barcode image to acquire the WiFi MAC address comprises:

applying binarization processing on the two-dimensional barcode image to acquire a plurality of binary values;

searching for positioning symbols and correction symbols in the plurality of binary values;

according to the positioning symbols and the correction symbols, performing image transformation on the plurality of binary values to generate a symbol code matrix;

decoding the symbol code matrix conforming to coding standards, and acquiring parsed data comprising the WiFi MAC address when the decoding is completed.

3. The connection method according to claim 1, wherein the performing the data transmission by the mobile device with the display device comprises:

transmitting by the mobile device image data displayed on a screen of the mobile device to the display device, enabling the display device to display on its screen an image corresponding to the image data.

4. The connection method according to claim 1, wherein the performing the data transmission by the mobile device with the display device comprises:

acquiring, by the mobile device, image data displayed on the screen of the display device, and displaying on the screen of the mobile device an image corresponding to the image data.

5. The connection method according to claim 1, further comprising:

when the mobile device determines that the signal strength of the current WiFi network is smaller than the predetermined value, disconnecting by the mobile device the connection with the display device.

6. The connection method according to claim 5, wherein the predetermined value is −70 dbm.

7. The connection method according to claim 1, further comprising:

when the mobile device determines that the two-dimensional barcode image and the prestored image have more than two-thirds in common, the two-dimensional barcode image is determined to be the same with the prestored image.

8. The connection method according to claim 1, further comprising:

when the mobile device determines that the format of the WiFi MAC address is not correct, re-scanning by the mobile device the two-dimensional barcode image displayed on the screen of the display device.

9. A connection method for wireless display, comprising:

activating, by a mobile device, an application program, wherein a camera of the mobile device is turned on concurrently when the application program is activated;

scanning, by the mobile device via the camera, a two-dimensional barcode image displayed on a screen of a display device and thus acquiring the two-dimensional barcode image, wherein the two-dimensional barcode image is recorded with a WiFi MAC address of the display device;

determining by the mobile device whether the two-dimensional barcode image is identical with a prestored image, if not, processing the two-dimensional barcode image to acquire the WiFi MAC address;

further determining by the mobile device whether a format of the WiFi MAC address is correct, when it is correct, storing the two-dimensional barcode image and its corresponding WiFi MAC address;

broadcasting by the mobile device the WiFi MAC address to a WiFi display module of the mobile device, and establishing a data connection by the WiFi display module with the display device via the WiFi MAC address; and performing data transmission by the mobile device with the display device.

10. The connection method according to claim 9, further comprising:

when the two-dimensional barcode image is determined to be identical with the prestored image, acquiring the WiFi MAC address corresponding to the prestored image, and establishing a data connection by the WiFi display module with the display device via the WiFi MAC address.

11. The connection method according to claim 9, wherein the processing the two-dimensional barcode image to acquire the WiFi MAC address comprises:

applying binarization processing on the two-dimensional barcode image to acquire a plurality of binary values;

searching for positioning symbols and correction symbols in the plurality of binary values;

according to the positioning symbols and the correction symbols, performing image transformation on the plurality of binary values to generate a symbol code matrix;

decoding the symbol code matrix conforming to coding standards, and acquiring parsed data comprising the WiFi MAC address when the decoding is completed.

12. The connection method according to claim 9, wherein the performing the data transmission by the mobile device with the display device comprises:

transmitting by the mobile device image data displayed on a screen of the mobile device to the display device, enabling the display device to display on its screen an image corresponding to the image data.

13. The connection method according to claim 9, wherein the performing the data transmission by the mobile device with the display device comprises:

acquiring, by the mobile device, image data displayed on the screen of the display device, and displaying on a screen of the mobile device an image corresponding to the image data.

14. The connection method according to claim 9, further comprising:
when the mobile device determines that the two-dimensional barcode image and the prestored image have more than two-thirds in common, the two-dimensional barcode image is determined to be the same with the prestored image.

15. The connection method according to claim 9, further comprising:
when the mobile device determines that the format of the WiFi MAC address is not correct, re-scanning by the mobile device the two-dimensional barcode image displayed on the screen of the display device.

16. A mobile device, comprising:
a processor; and
a non-transitory program storage medium, comprising:
an application program module, configured to activate an application program, wherein a camera of the mobile device is turned on concurrently when the application program is activated;
an image acquisition module connected to the application program module, being configured to scan via the camera a two-dimensional barcode image displayed on a screen of a display device and thus acquire the two-dimensional barcode image, wherein the two-dimensional barcode image is recorded with a WiFi MAC address of the display device;
an image determination module connected to the image acquisition module, being configured to determine whether the two-dimensional barcode image is identical with a prestored image;
an address acquisition module connected to the image determination module, being configured to, when the image determination module determines that the two-dimensional barcode image is not identical with the prestored image, process the two-dimensional barcode image to acquire the WiFi MAC address;
an address format determination module connected to the address acquisition module, being configured to determine whether a format of the WiFi MAC address is correct;
a storage module connected to the address format determination module, being configured to, when the address format determination module determines that the format of the WiFi MAC address is correct, store the two-dimensional barcode image and its corresponding WiFi MAC address;
a data broadcasting module connected to the storage module, being configured to broadcast the WiFi MAC address to a WiFi display module of the mobile device;
the WiFi display module, which is connected to the data broadcasting module, being configured to establish a data connection with the display device via the WiFi MAC address; and
a data transmission module connected to the WiFi display module, being configured to, when the WiFi display module completes the data connection with the display device via the WiFi MAC address, perform data transmission between the mobile device and the display device.

17. The mobile device according to claim 16, wherein, the address acquisition module is configured to, when the image determination module determines that the two-dimensional barcode image is identical with the prestored image, acquire the WiFi MAC address corresponding to the prestored image, enabling the WiFi display module to establish the data connection with the display device via the WiFi MAC address.

18. The mobile device according to claim 16, wherein the address acquisition module comprises:
a binarization unit, configured to apply binarization processing on the two-dimensional barcode image to acquire a plurality of binary values;
a symbol searching unit connected to the binarization unit, being configured to search for positioning symbols and correction symbols in the plurality of binary values;
an image transformation unit connected to the symbol searching unit, being configured to apply image transformation on the plurality of binary values according to the positioning symbols and the correction symbols, so as to generate a symbol code matrix; and
a decoding unit connected to the image transformation unit, being configured to decode the symbol code matrix conforming to coding standards, and to acquire parsed data containing the WiFi MAC address when the decoding is completed.

19. The mobile device according to claim 16, wherein, the data transmission module transmits image data displayed on a screen of the mobile device to the display device, enabling the display device to display on its screen an image corresponding to the image data.

20. The mobile device according to claim 16, wherein, the data transmission module acquires image data displayed on the screen of the display device, and displays on the screen of the mobile device an image corresponding to the image data.

* * * * *